(12) United States Patent
Heilig

(10) Patent No.: US 6,361,113 B2
(45) Date of Patent: Mar. 26, 2002

(54) VEHICLE SEAT WITH DISPLACEABLE HEADREST

(75) Inventor: Alexander Heilig, Wissgoldingen (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/730,953

(22) Filed: Dec. 6, 2000

Related U.S. Application Data

(62) Division of application No. 09/445,341, filed as application No. PCT/EP98/03624 on Jun. 16, 1998, now Pat. No. 6,217,118.

(30) Foreign Application Priority Data

Jun. 16, 1997 (DE) .................................... 297 10 511 U
Nov. 10, 1997 (DE) .................................... 297 19 937 U

(51) Int. Cl.[7] ................................................ B60N 2/48
(52) U.S. Cl. ..................................................... 297/410
(58) Field of Search ................................. 297/391, 410, 297/216.12, 217.3; 250/730.1

(56) References Cited

U.S. PATENT DOCUMENTS

| 4,490,842 A | 12/1984 | Watanabe |
| 5,324,071 A | 6/1994 | Gotomyo et al. |
| 5,836,651 A | 11/1998 | Szerdahelyi et al. |
| 6,062,644 A | 5/2000 | Lance ........................ 297/410 |
| 6,065,810 A | 5/2000 | Koenig et al. |

FOREIGN PATENT DOCUMENTS

| DE | 4231523 A1 | 3/1994 |
| DE | 19614314 A1 | 10/1996 |
| EP | 0593845 A1 | 4/1994 |
| JP | 03286713 | 12/1991 |

Primary Examiner—Peter R. Brown
(74) Attorney, Agent, or Firm—Tarolli, Sundheim, Covell, Tummino & Szabo L.L.P.

(57) ABSTRACT

A vehicle seat with a back rest (72) in which a sliding guide (74) is provided, and with a headrest which is fixed to the back rest (72) by means of at least one guide rod (76) inserted into the sliding guide (74), and is provided with a functional unit (20, 23) which is connectable electrically with a base unit arranged outside the headrest, is characterized in that the guide rod (76) is used for the electrical connection of the functional unit.

3 Claims, 5 Drawing Sheets

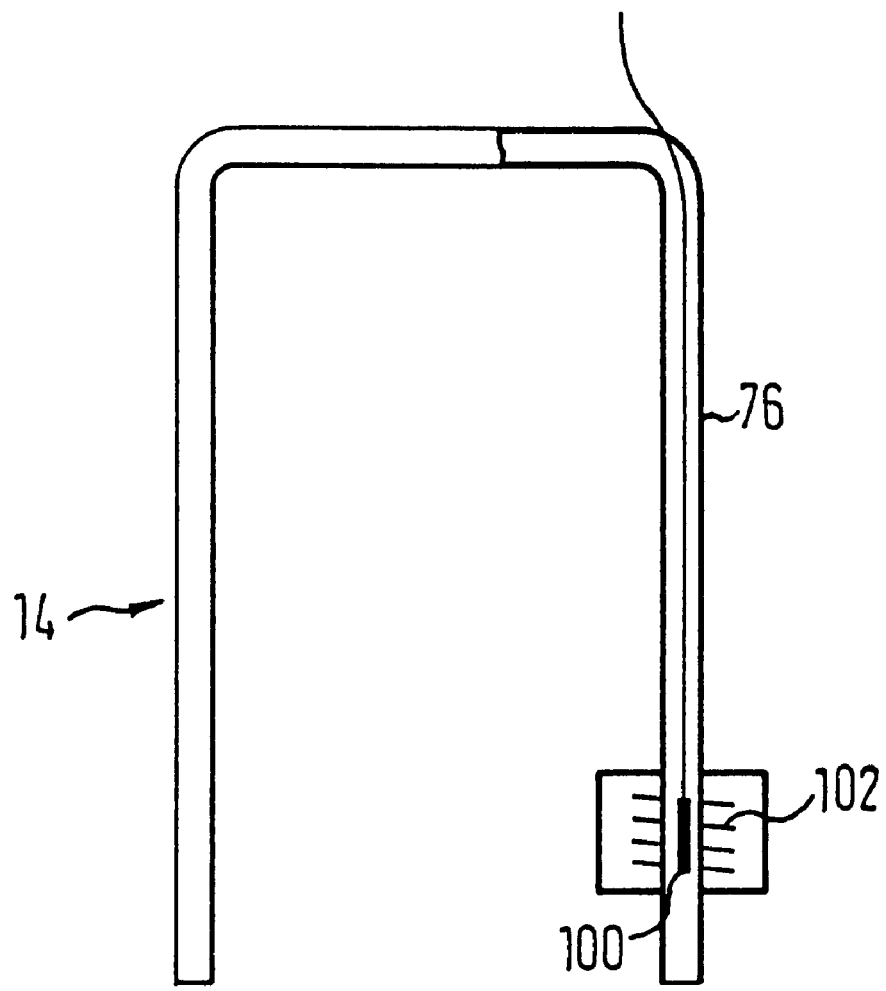

VEHICLE SEAT WITH DISPLACEABLE HEADREST

This application is a divisional of application Ser. No. 09/445,341, filed on Dec. 7, 1999, now U.S. Pat. No. 6,217,118 which claims priority to PCT International Application PCT/EP98/03624, filed on Jun. 16, 1998 and which designated the U.S.

The invention relates to a vehicle seat with a back rest in which a sliding guide is provided, and with a headrest which is fixed to the back rest by means of at least one guide rod inserted into the sliding guide, and is provided with a functional unit which is connectable electrically with a base unit arranged outside the headrest.

Inter alia in the case of a rear impact, the headrest prevents the head of a vehicle occupant from being thrown rearward relative to the vehicle. In order to be able to develop its restraining effect optimally, the headrest must be adapted suitably to the position of the head of the vehicle occupant with respect to the back rest, in particular vertically. For this purpose, the headrest is arranged displaceably on the back rest by means of usually two guide rods.

Recently, the headrest also increasingly serves to receive various types of functional units such as, for example, a restraint device which is provided with a gas generator and which can provide for an active adjustment of the headrest in the case of an accident, or activates a gas bag which can restrain the head of the vehicle occupant. These functional units, in particular in the case of a unit to be activated in the case of a vehicle accident, must be connected with a particularly high degree of reliability to a base unit, for example an activating device for the gas generator. A particular problem is ensuring the connection of the functional unit with the base unit reliably over the entire possible adjustment range of the headrest with the possible extreme conditions which can occur, namely on the one hand with a headrest which is adjusted extremely frequently in the course of its lifespan, and on the other hand with a headrest which always remains in one position, once selected, in the course of its lifespan.

The necessary reliable connection is ensured according to the invention in a vehicle seat of the type initially mentioned in that the guide rod is used for the electrical connection of the functional unit. In contrast to the hitherto intended solutions, in which the functional unit is controlled or activated remotely, i.e. without direct electrical connection to the base unit, the use of the guide rod allows to achieve a connection of the functional unit with the base unit which is very reliable in operation. The electrical connection, however, can not only serve to control a gas generator but also to control other units accommodated in the headrest, e.g. loudspeakers of a mobile radiotelephone.

According to a preferred embodiment of the invention, provision is made that the guide rod serves as a guide for a cable by which the functional unit is connected to the base unit. In this way, a connection between the functional unit and the base unit can be achieved which is very secure with respect to mechanical influences.

Preferably, the guide rod is arranged adjustably on the back rest.

According to the preferred embodiment, provision is further made that in the lower end of the guide rod, pushed into the back rest, a plug connection element is arranged which engages into a complementary plug connection element in the back rest. The use of a plug connection makes it possible to connect the functional unit with the base unit almost automatically on insertion of the back rest into the sliding guide, or to separate it from the base unit on removal of the headrest, when the two plug connection elements of the plug connection are suitably arranged. In addition, the headrest can also be completely separated from the seat without extra expenditure.

According to the preferred embodiment, provision is further made that the plug connection element arranged in the guide rod is stationary relative thereto and that the plug connection element arranged in the back rest is displaceable relative to the sliding guide. In this construction, the plug connection element arranged in the back rest follows the movements of the plug connection element arranged in the guide rod and hence at the headrest, so that the possibility of adjustment for the headrest is in no way impaired.

According to this preferred embodiment, provision is further made that the plug connection element arranged in the back rest is biased towards the upper end of the back rest by a spring. The plug connection element arranged in the back rest is therefore always biased towards the plug connection element arranged in the guide rod, so that an unintentional loosening of the plug connection is prevented.

According to this preferred embodiment of the invention, provision is further made that the spring acts on the plug connection element arranged in the back rest with a force which is greater than the force which is necessary for the engagement of the two plug connection elements with each other. In this way, it is ensured that on mounting the headrest to the back rest, the two plug connection elements are reliably connected with each other by means of the force which is necessary for overcoming the spring and for pressing down the plug connection element arranged in the back rest by the plug connection element arranged in the guide rod. Furthermore, of course the displaceable plug connection element can also be arranged in the guide rod and the stationary plug connection element in the sliding guide. In addition, it is possible to provide a device which permits pushing the guide rod further into the sliding guide only after closing of the plug connection. Thereby, it is to be prevented that the guide rod is introduced deep into the sliding guide although the plug connection has not materialized.

Advantageous embodiments of the invention will become apparent from the sub-claims.

The invention is described hereinbelow with reference to the enclosed drawings, in which:

FIG. 4 shows diagrammatically a longitudinal section through a guide rod and the associated sliding guide according to a third embodiment of the invention.

Figure 1:
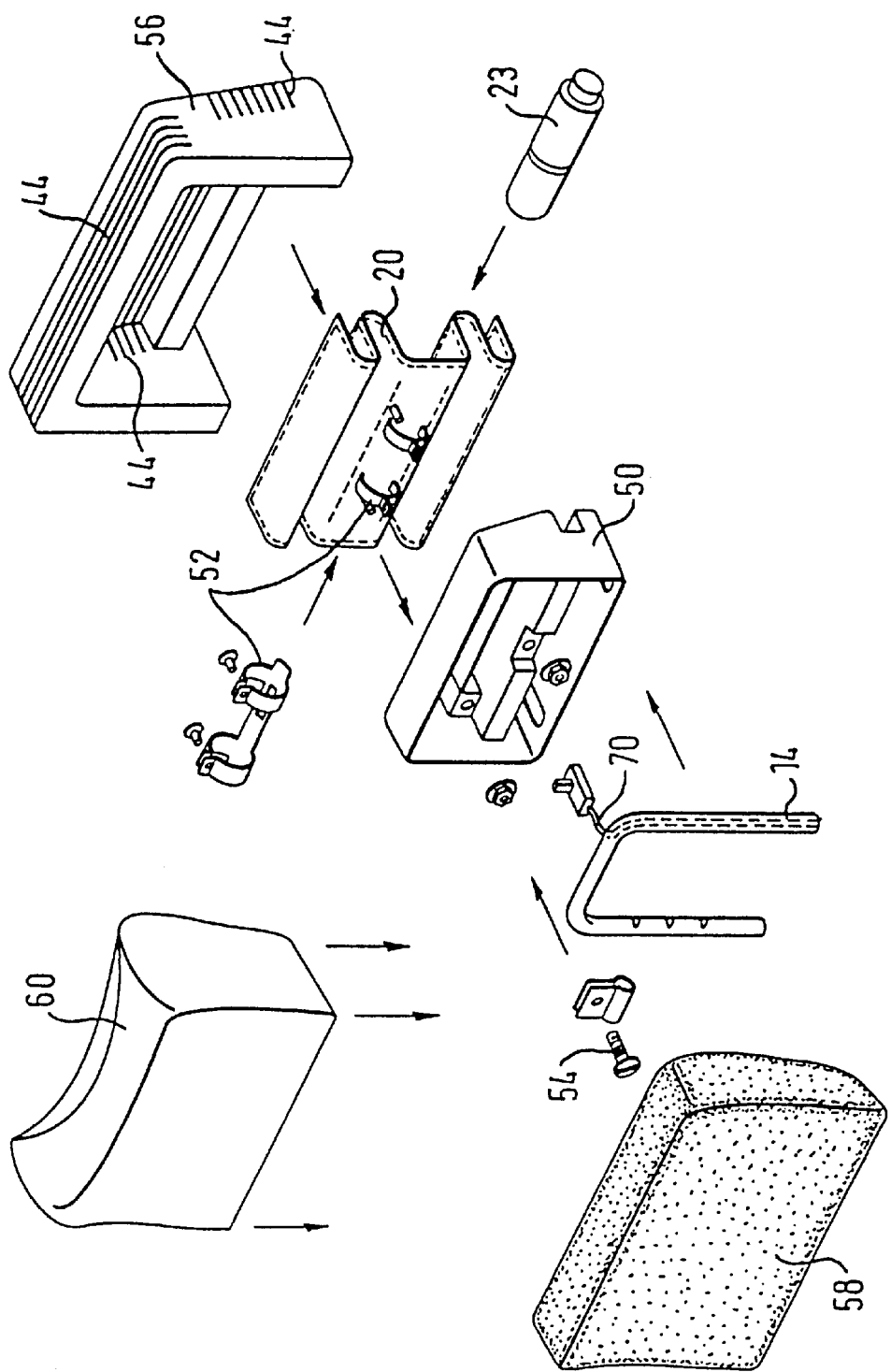
FIG. 1 shows a perspective exploded view of a headrest as part of the vehicle seat according to the invention.

In FIG. 1, a headrest is shown diagrammatically, which can be used as part of a vehicle seat according to the invention. The headrest comprises a front padding part 56 and a rear padding part 58, over which a fabric cover 60 can be slipped. Between the paddings a body 50 is arranged which carries the two padding parts and can be connected with a back rest (not illustrated) of a vehicle seat by means of two guide rods which are constructed as a U-shaped guide part 14. A gas generator 23 and a gas bag 20 are arranged on the body 50 by means of a clamp strap 52 and a screw- and clip-connection 54. The special construction of the gas generator and of the gas bag are of no importance here; the only relevant factor is that the functional unit formed from the gas bag and the gas generator can be connected to a base unit (not illustrated) by means of the diagrammatically illustrated cable 70, this base unit in the present case being able to activate the gas generator when required.

Figure 2:
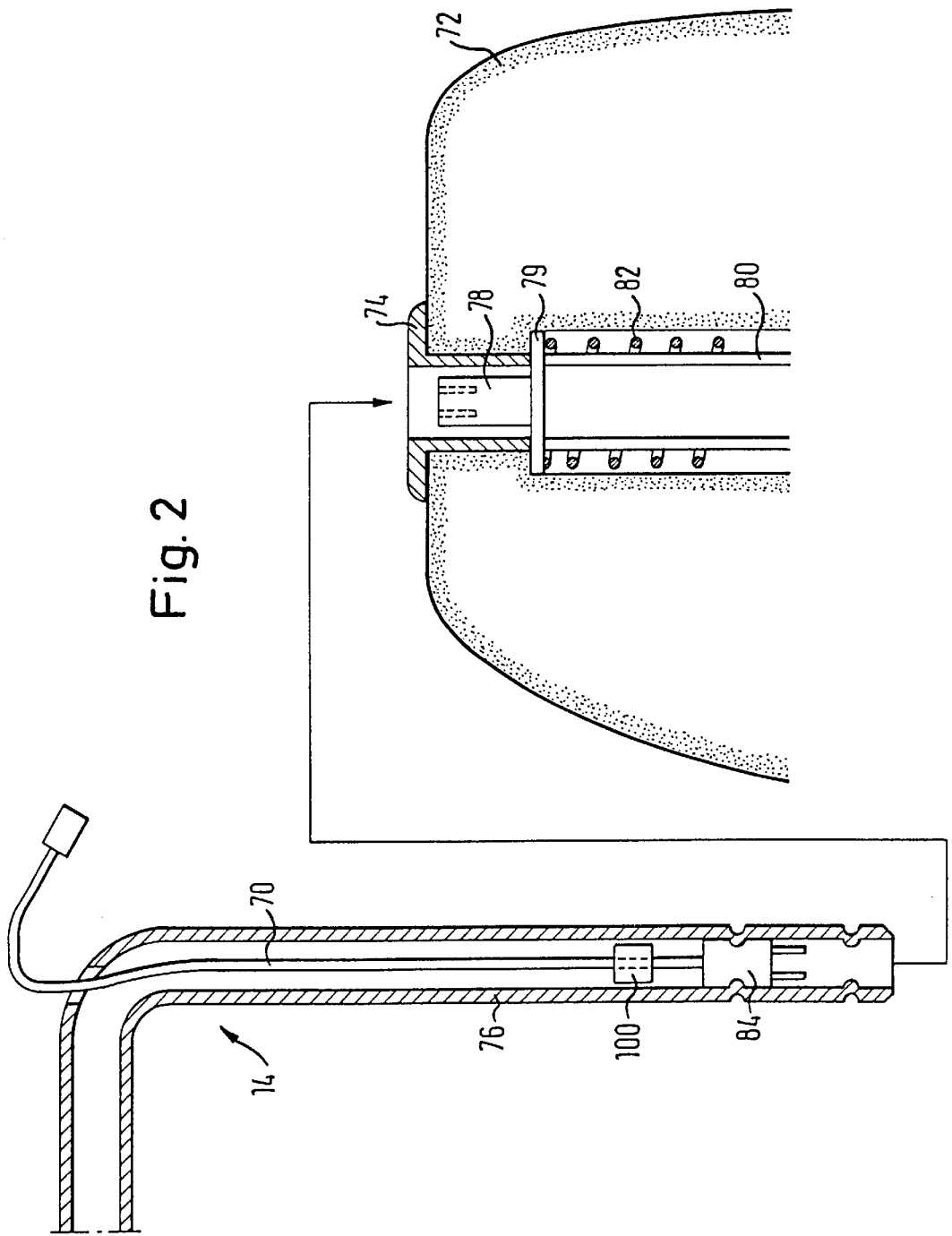
FIG. 2 shows diagrammatically a longitudinal section through a guide rod and the associated sliding guide according to a first embodiment of the invention.

In FIG. 2, the upper section of a back rest 72 of a vehicle seat is shown diagrammatically. Provided on the back rest is a sliding guide 74 into which a guide rod 76 of the U-shaped guide part 14 for the headrest can be inserted. Beneath the sliding guide 74 a plug connection element 78 is arranged, which is held displaceably in a tube 80. The plug connection element 78 is biased towards the sliding guide 74 into a position of rest by means of a spring 82. The plug connection element 78 can be moved in the tube 80 over such a path that the possible adjustment range of the headrest is not impaired. To establish the alignment of the plug connection element 78 in circumferential direction, radial extensions 79 of the base project through slits in the tube 80. In the upper region the tube 80 is no longer slitted, to form an upper stop.

A plug connection element 84 is pushed into the hollow interior of the guide rod 76 and connected with the guide rod 76 by pressing, the plug connection element 84 being complementary to the plug connection element 78. When the two plug connection elements 78, 84 engage into each other, an electrical plug connection is formed. The cable 70 known from FIG. 1 is connected with the plug connection element 84. Viewed from the headrest, directly in front of the electrical contact point a so-called intelligent periphery unit 100 is inserted into the electrical line formed by the cable 70. The periphery unit 100 represents a connection to a so-called data bus system which has a connection to the base unit and via which data, e.g. data which are picked up at the igniter of the gas generator 23, are passed on to the base unit and which also provides for a reverse signal exchange. Stated more generally, the periphery unit 100 can be arranged directly in front of or after an electrical contact point between the electrical line sections which are associated with the guide rod 76 and the sliding guide 74. An electrical contact point here means the plug connection shown in FIG. 2 or the electrical connection described in further detail with the aid of FIG. 3.

The connection between the base unit and the functional unit arranged in the headrest is effected automatically during mounting of the headrest on the back rest. The biasing force of the spring 82 is in fact selected such that first the force necessary for engaging the plug connection elements 78 and 84 with each other is overcome before the plug connection element 78 is moved out from the position of rest. During insertion of the guide rod 76 into the sliding guide 74, the plug connection element 84 is automatically positioned opposite the plug connection element 78 which is biased into the position of rest shown in FIG. 2 by the spring 82. When the guide rod 76 is then pressed into the sliding guide, the two plug connection elements 78, 84 are inserted into each other.

The plug connection also makes it possible to take the headrest completely out of the back rest. In so doing, the plug connection is automatically disconnected. As soon as the headrest is inserted into the back rest again, the connection between the functional unit and the base unit is produced again.

Figure 3:
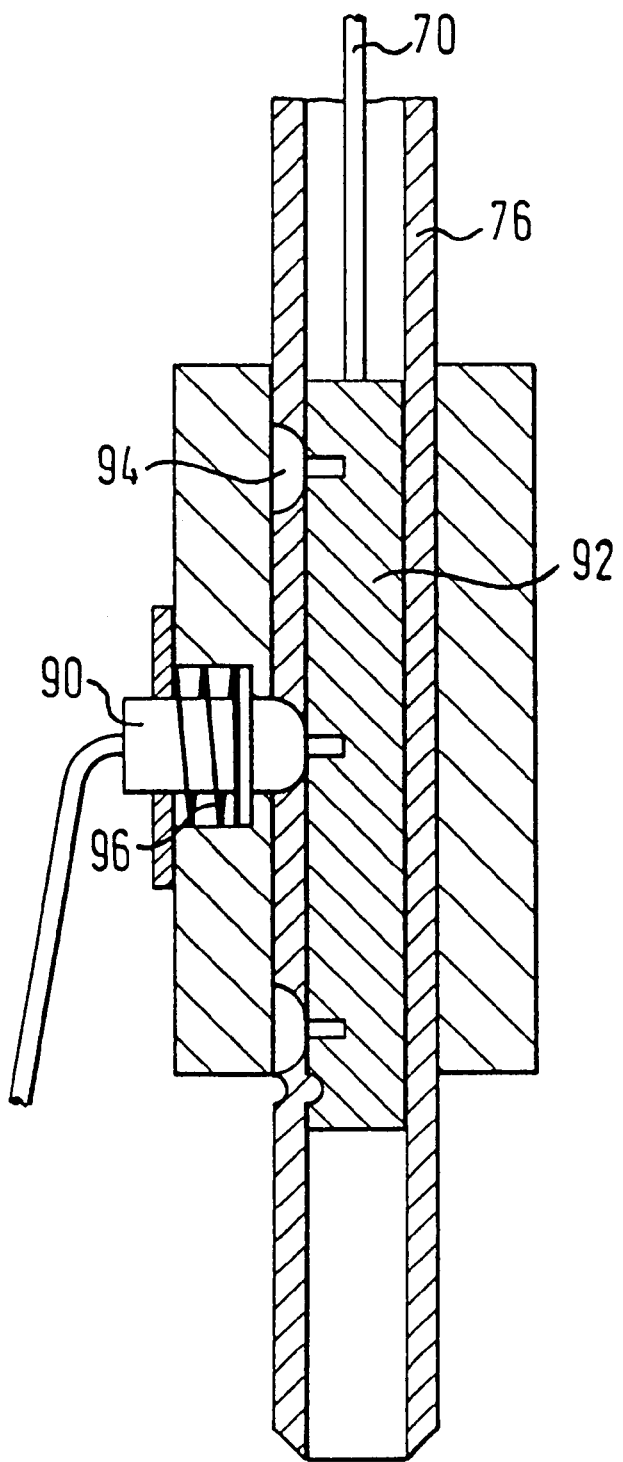
FIG. 3 shows diagrammatically a longitudinal section through a guide rod and the associated sliding guide according to a second embodiment of the invention.

In FIG. 3 a detail of a second embodiment of the invention is shown diagrammatically. For the connection between the base unit and the functional unit, a contact pin 90 is used here which is in electrical contact with a contact element 92, which is arranged in the guide rod 76. Provided in the guide rod 76 and in the contact element 92 are recesses 94 which, together with the contact pin 90 biased towards the contact element 92 by means of a spring 96, serve for arresting the headrest in various heights. With this design, a contact pin 90 and a contact element 92 are preferably provided in each of the two guide rods 76, so that a forward line to and a return line from the functional unit are available.

In FIG. 4 a guide element 14 is shown in accordance with a third embodiment of the invention. In this embodiment, a device for inductive signal transmission is used, which consists of a coil 100 arranged inside the guide rod 76 and of a coil 102 arranged in the back rest. The arrangement and the extent of the coils 100 and 102 are of course selected so that the signal transmission is possible over the entire adjustment range of the headrest. Also in this embodiment provision can be made that the forward and return lines are divided on the two guide rods of the guide part 14.

Figure 5A:
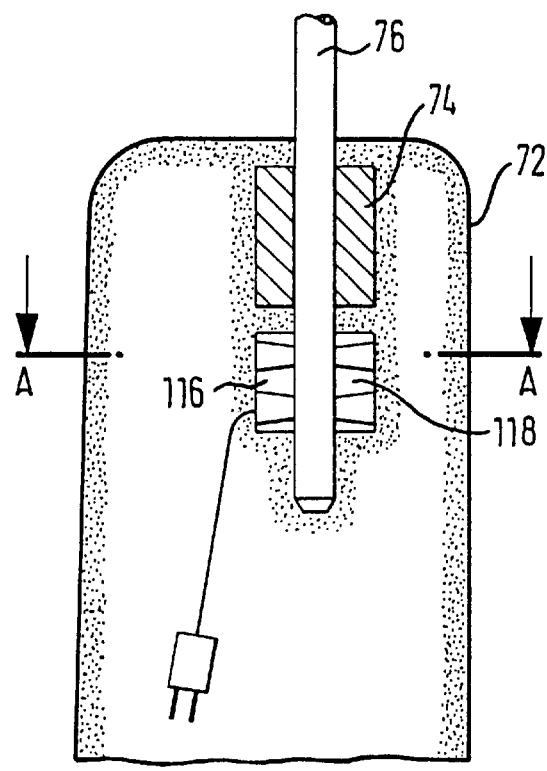
FIG. 5 shows diagrammatically a longitudinal section through a guide rod and the associated sliding guide according to a fourth embodiment of the invention.
Figure 5B:
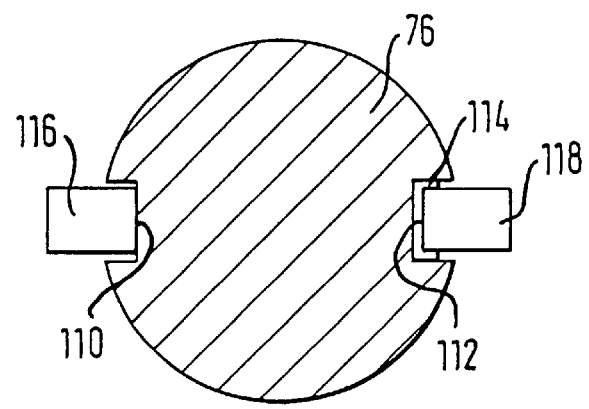

In FIGS. 5a and 5b a fourth embodiment of the invention is illustrated diagrammatically. In this embodiment the guide rod 76 consists of an electrically conductive material, two contact tracks 110, 112 being provided. The contact track 110 is provided directly on the guide rod 76, whereas the contact track 112 is separated from the material of the guide rod 76 by means of an insulation 114. Sliding contacts 116, 118 are associated with the two contact tracks 110 and 112. The sliding contacts can be constructed in a corrugated shape in order to improve the contact with the sliding tracks.

According to an alternative to the fourth embodiment, provision can be made that each of the two guide rods 76 is provided with a single contact track so that forward and return lines are formed.

According to a further development not illustrated in the drawings, the guide rod 76 can serve simultaneously as a housing for a gas generator which is provided to cooperate with the gas bag 20. This gas generator can be constructed in several parts so that after its activation only one part has to be replaced.

What is claimed is:

1. A vehicle seat comprising:
a back rest with a sliding guide;
a headrest having a guide rod extending into said sliding guide, said headrest and said guide rod being movable relative to said back rest and said sliding guide;
an electrical component mounted on said headrest; and
a device for electrically communicating said electrical component with a base unit located outside said headrest, said device including an inductive signal transfer device, said inductive signal transfer device including a first member connected with said guide rod and a second member connected with said back rest, said first member being movable with said guide rod relative to said back rest and said second member, said second member being a coil arranged in said back rest.

2. A vehicle seat as set forth in claim 1 wherein said coil arranged in said back rest surrounds a lower end portion of said guide rod extending into said sliding guide.

3. A vehicle seat as set forth in claim 1 wherein said first member is arranged at a lower end of said guide rod extending into said sliding guide and said second member is arranged in said back rest.

* * * * *